Patented Apr. 1, 1952

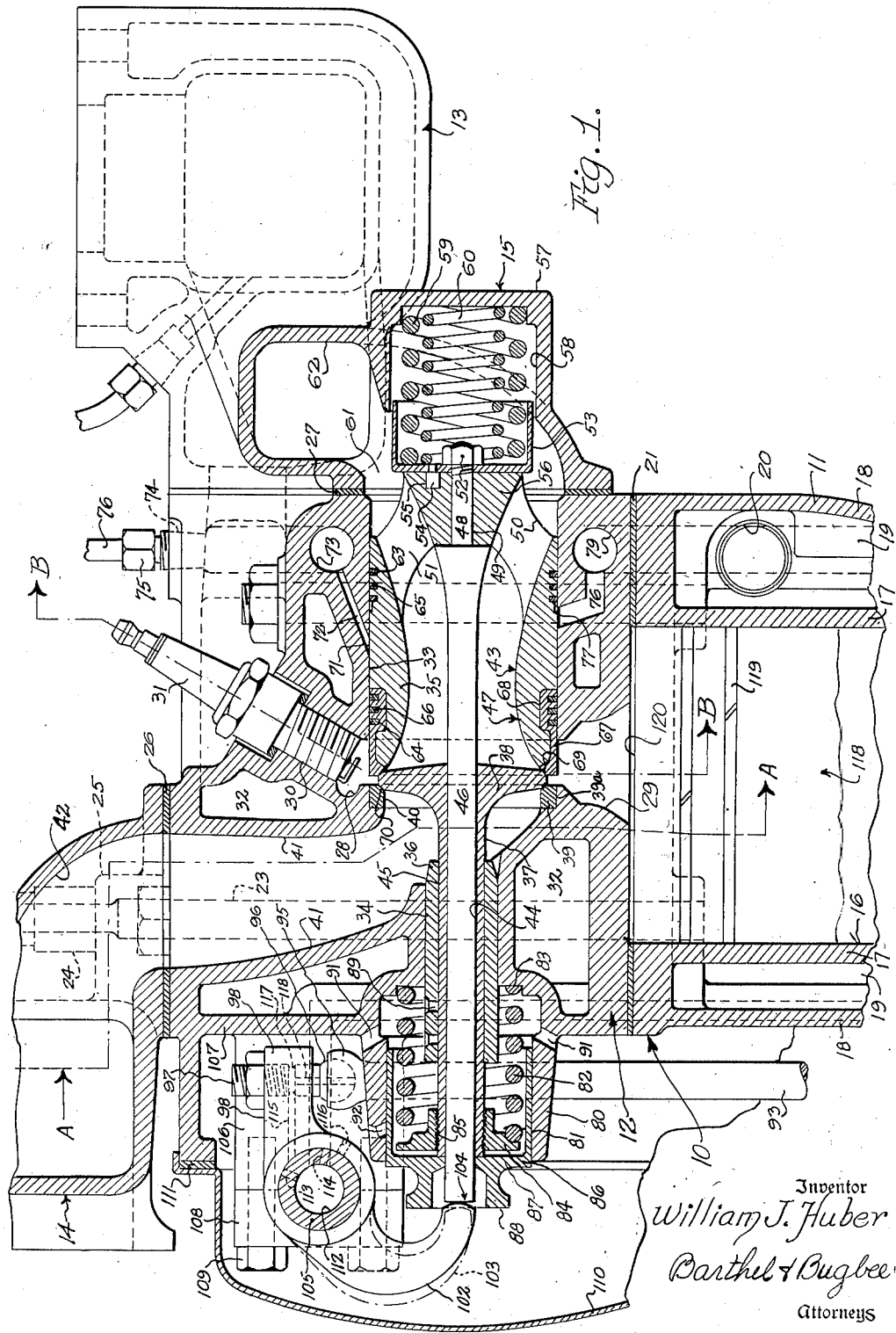

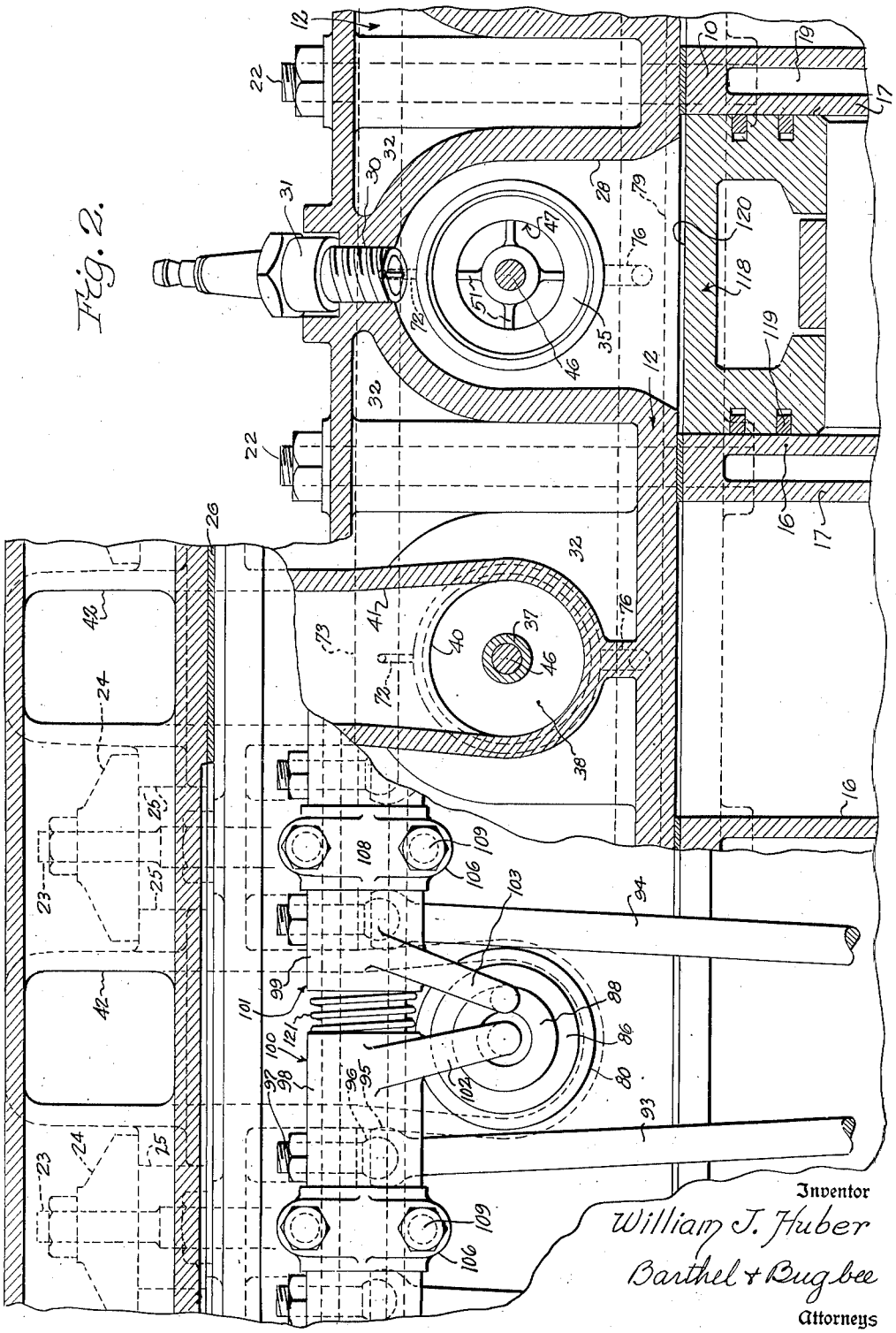

2,591,156

UNITED STATES PATENT OFFICE 2,591,156

VENTURI INTAKE VALVE

William J. Huber, Detroit, Mich., assignor to
Mell A. Bolton, Berkley, Mich.

Application March 10, 1950, Serial No. 148,907

5 Claims. (Cl. 123—79)

This invention relates to internal combustion engines and, in particular, to valve mechanisms for such engines.

Internal combustion engines have hitherto presented serious difficulties in the construction and operation of valves. Where such valves have been of the poppet type with separate and spaced intake and exhaust valves, the exhaust valves have tended to be subject to rapid deterioration due to the intensely hot gases which pass over the head of the valve as the exploded gases pass from the combustion chamber to the exhaust manifold. Moreover, it has been difficult to bring about expulsion of all of the exhaust gases in the brief time period allotted to such action, particularly in high speed engines.

Small diameter valves are easiest to cool, yet tend to give inadequate expulsion of the exhaust gases. Increasing the diameter of the exhaust valve, while improving the efficiency of expulsion of the gases, acts in the opposite direction by making the valve more difficult to cool and therefore increasing its rate of deterioration. The large exhaust valves also increase the size of the engine in its upper portions, greatly increasing its weight due to the disproportionate amount of metal which must be added to the cylinder block to accommodate such larger valves. The present invention eliminates or greatly reduces these difficulties and is an improvement in that respect over the valve arrangement shown in my previous Patent No. 2,192,913, issued March 12, 1940, for Internal Combustion Engine Valves.

One object of the present invention is to provide a combined intake and exhaust valve unit for internal combustion engines which is applicable to valve-in-the-head engines, thereby simplifying the construction of the engine as a whole by employing a far less complicated cylinder block construction.

Another object is to provide a combined intake and exhaust valve unit of the foregoing character wherein the exhaust valve is a poppet valve and the intake valve is a sleeve having a Venturi passageway therethrough which speeds up the velocity of the gas entering the combustion chamber, hence creates a pressure difference which thereby enhances the entry of the intake gas to the combustion chamber during the time the intake valve is open.

Another object is to provide a combined intake and exhaust valve unit of the foregoing character wherein the valve units reciprocate in directions transverse to the axes of the cylinder bores, thereby straightening the passageways between the combustion chamber and the intake and exhaust manifolds and consequently increasing the efficiency of the engine as well as shortening the distances which the intake and exhaust gases must travel between the combustion chamber and the intake and exhaust manifolds.

Another object is to provide a combined intake and exhaust valve unit of the foregoing character wherein a pair of spaced sets of rings is provided for the sleeve or intake valve, thereby preventing lubricating oil from getting into the intake side of the valve.

Another object is to provide a combined intake and exhaust valve unit of the foregoing character wherein the intake and exhaust valves have telescoping stems operated by rocker arms, one of which engages the solid stem inside the valve assembly and the other of which engages the annular rim of the tubular outside stem, thereby simplifying the mechanism and reducing the number of moving parts.

Another object is to provide a combined intake and exhaust valve unit of the foregoing character wherein an oil scavenging passageway is provided in the sleeve valve bore, thereby eliminating any surplus oil which might otherwise escape past the sleeve intake valve as well as scavenging any "blow-by" from the combustion chamber past the rings of the intake valve sleeve.

In the drawings:

Figure 1 is an enlarged fragmentary vertical section through the cylinder and cylinder head of an internal combustion engine, showing the improved valve unit of the present invention; and Figure 2 is a left-hand side elevation of the mechanism shown in Figure 1, with the rocker arm cover plate removed, the central portion of Figure 2 being in section along the line a—a in Figure 1, and the right-hand side of Figure 2 being in section along the line b—b in Figure 1.

Referring to the drawings in detail, Figures 1 and 2 show an internal combustion engine, generally designated 10, according to one form of the present invention as consisting generally of a cylinder block 11 upon which is mounted a cylinder head 12 having intake and exhaust manifolds 13 and 14 respectively secured thereto with a combined intake and exhaust valve unit 15 therein, according to the present invention. The cylinder block 11 is of any suitable type having cylinder bores 16 surrounded by inner and outer walls 17 and 18 between which is a chamber or water jacket 19 for cooling purposes having a port 20 opening into these chambers. A gasket 21 is interposed between the cylinder block 11 and cylinder head 12 to prevent leakage therebetween and studs 22 and 23 serve the purpose of bolting the cylinder head 22 to the cylinder block 11. The exhaust manifold 14 is secured to the cylinder head 12 by bridge or holddown members 24 (Figure 2) mounted on the studs 23 and spanning the intervals between adjacent cylinders by engaging cheeks or bosses 25 projecting laterally into these intervening spaces. A gasket 26 is interposed between the cylinder head 12 and the exhaust manifold 14. A similar gasket 27 is interposed between the intake manifold 13 and the cylinder head 12.

The cylinder head 12 is provided with dome-like combustion chambers 28 (Figure 2) having passageways 29 connecting them with the tops of the cylinder bores 16. A threaded bore 30 at the summit of each combustion chamber 28 receives the threaded lower portion of a spark plug 31 of conventional construction and connected to a conventional ignition system. The cylinder head 12 is provided with a cooling liquid chamber 32 which is provided with connections to the vehicle radiator or, in the case of a marine engine, to the cooling liquid pump and overboard discharge respectively. The cooling chamber 32 is of irregular configuration due to the fact that it extends around the various portions of the valve unit 15 to cool the latter with the utmost efficiency.

Extending horizontally in opposite directions from each combustion chamber 28 is a pair of coaxial bores 33 and 34, the former reciprocably receiving an intake valve member or sleeve 35 and the latter a tubular bearing 36 reciprocably receiving the tubular valve stem 37 of a poppet exhaust valve 38. The rim of the poppet exhaust valve 38 on one side engages the end of the intake valve sleeve 35 and on the other side an annular valve seat insert 39 mounted in an annular recess 39a in the port 40 located between the combustion chamber 28 and the cylinder head exhaust passageway 41 leading upward to the manifold exhaust passageway 42 (Figure 1). The valve sleeve 35 is provided with a passageway 43 of venturi configuration therethrough.

The tubular stem 37 of the poppet valve 38 is provided with a bore 44 coaxial with the bores 33 and 34 as well as with the bore 45 extending through the tubular bearing 36 and reciprocably receiving the solid stem 46 of the intake valve or valve assembly, generally designated 47, the latter including the valve sleeve 35 previously referred to. The stem 46 is preferably tubular to reduce its weight with welded plugs at its opposite ends, and has a reduced diameter portion 48 which passes through a bore 49 in a spider 50 connecting the diametrically opposite portions of the valve sleeve 35 while leaving intake ports 51 through the spider 50. A nut 52 threaded on the inner end of the reduced diameter portion 48 holds the latter in assembly with the spider 50, and also holds a cup-shaped spring retainer 53 in position. The latter is provided with a pin 54 seated in a socket 55 in the hub 56 of the spider 50 (Figure 1) for preventing rotation thereof. A portion of the intake manifold 13 forms a spring casing 57 for each cylinder and valve unit 15 having a socket 58 in which outer and inner helical springs 59 and 60 are seated. The outer ends of the springs engage the end wall of the spring casing 57 whereas the inner ends engage the cup-shaped spring retainer 53, urging the intake valve 47 into engagement with the rim of the poppet valve 38. Intake ports 61 lead from the bore 33 to the intake manifold passageways 62, these in turn leading into the interior of the intake manifold 13.

The intake valve sleeve 35 is preferably constructed of a light metal alloy, such as an aluminum alloy, and near its opposite ends if provided with outer and inner sets of mutliple grooves 63 and 64 containing sets of outer and inner piston rings 65 and 66 respectively. The grooves 64 are continued in annular inserts or sleeves 67 of heat and wear-resisting material, such as steel inserted in an annular recess 68 in the inner end of the intake valve sleeve 35. The insert 67 has an annular seat 69 which engages the outer rim of the poppet valve 38, the inner rim of which engages a correspondingly annular seat 70 on the annular valve insert 39.

In order to lubricate the bore 33 for the smooth reciprocation of the valve sleeve 35, the upper side wall of the bore 33 is provided with a port or groove 71 having a passageway 72 leading therefrom upward to a passageway 73, the upper end of which terminates in a threaded port 74 into which is threaded a coupling 75 of an oil pressure pipe 76. The latter is connected to an oil pressure pump of a conventional type (not shown). To draw off excess oil, either from the lubricant port 71 or oil which makes its way along the bore 33 from the combustion chamber 28, a scavenging port or groove 77 is provided in the lower side wall of the bore 39 on the opposite side of the lubricant port 71 from the combustion chamber 28. The port or groove 77 is connected by a passageway 78 to a passageway 79, the latter being connected to the suction side of a conventional scavenging oil pump (not shown).

The cylinder head 12 on the opposite side from the spring casing 57 is provided with a tubular projection 80 having a bore 81 therein coaxial with the bores 34, 45 and 33 and containing a helical spring 82. The latter has its forward end seated against the end wall 83 of the bore 81 and has its opposite end seated against an internally threaded collar or retainer 84 which is threaded upon the outer end portion 85 of the tubular stem 37 of the poppet valve 38. Reciprocably mounted in the bore 81 is a cup-shaped valve tappet 86, the inner end wall 87 of which engages the end portion 85 of the tubular valve stem 37. The valve tappet 86 in turn is provided with an annular end wall 88 which is engaged by a rocker arm in a manner subsequently to be described.

In order to lubricate the stem 37 in its reciprocation, the tubular bearing 36 is provided with oil holes 89 and the upper wall of the tubular projection 80 is provided with an oil hole 90 through which oil may reach the oil holes 89. An additional oil hole 91 in the tubular projection 80 lubricates the valve tappet 86 and the bore 81. In its lower side wall, the tubular projection 80 is also provided with an oil drain hole 92 through which excess oil can return to the crankcase.

In order to reciprocate the poppet valve 38 and sleeve valve 35, the engine is provided with the usual cam shaft (not shown) driven at one-half the speed of the crankshaft and carrying cams which reciprocate push rods 93 and 94. The upper ends of the push rods 93 and 94 are provided with spherical sockets 95 which engage the ball ends 96 of studs 97 mounted in the inner portions 98 and 99 respectively of intake and exhaust valve rocker arms 100 and 101 having arcuate contact portions 102 and 103, the ends of which respectively engage the end 104 of the intake valve stem 46 and the end 88 of the exhaust valve tappet 86. The rocker arms 102 and 103 are rockably mounted on a tubular shaft 105 which is clamped in spaced supports 106 (Figure 1) extending outwardly from the side wall 107 of the cylinder head 12 at intervals therealong. The shaft 105 is held in position on the support 106 by caps 108 bolted thereto as at 109. A cover plate or casing 110 encloses the valve mechanism and prevents loss of lubrication as well as excluding the dust, a gasket 111 preventing leakage at the edges thereof.

In order to lubricate the various parts of the valve mechanism, the tubular shaft 105 is provided with a bore 112 which is connected to the pressure side of an oil pump and which has radial ports 113 and 114 in its periphery. These ports register respectively with ports or passageways 115 and 116 in each rocker arm 100 and 101. The passageway 115 leads to an annular groove 117 surrounding the stud 97 and a longitudinal passageway 118 extends downward from the groove 117 into the ball socket 95. The port 116, on the other hand, directly supplies lubricant to the ports 90 and 92 in the upper wall of the tubular projection 80.

Reciprocably mounted in the cylinder bore 16 is a piston 118 with piston rings 119 and a piston head or top wall 120 (Figure 1), the connecting rod and wrist pin being omitted for simplicity of showing. In order to eliminate side play from the rocker arms 100 and 101, a helical spring 121 is placed between them on the hollow shaft 105.

Operation

In the operation of the invention, let it be assumed that the valve unit 15 is in its closed position shown in Figure 1 with the poppet exhaust valve 38 closed tightly against its seat 70 and with the intake sleeve valve 35 firmly seated against the poppet valve 38 at the annular seat 69. Let it also be assumed that the previous stroke of the piston 118 has driven out the exhaust or burned gases and that the piston is ready to perform its fuel intake stroke.

As the piston 118 moves downward, the cam shaft and intake cams thereon move the intake push rods 93 upward, rocking the intake rocker arm 100 around the tubular shaft 105 and causing the intake valve stem 46 to be pushed to the right or outward (Figure 1). This push is transmitted to the valve sleeve 35 by the spider 50, moving the sleeve 35 to the right and uncovering the combustion chamber 28 and passageway 29 leading thereto. The suction created by the descent of the piston 118 causes fuel gas to be drawn from the intake manifold 13 through the passageways 62, 61 and 51, the Venturi passageway 43, the combustion chamber 28 and the passageway 29 into the cylinder bore 16, filling these passageways and bores with the fuel gas which, it is assumed, has been properly mixed by the carburetor, the Venturi passageway 43 causing a speeding up of the gas and a supercharging effect to take place in the cylinder bore 16.

When the piston 118 reaches the bottom of its stroke and commences its compression stroke, the consequent rotation of the intake cam permits the intake valve 47 and its valve sleeve 35 to move to the left under the influence of the springs 59 and 60, closing the passageway between the intake valve sleeve 35 and the poppet valve 38 and causing these to firmly engage one another. All communication is thus cut off from the cylinder bore 16 and the rising piston 118 compresses the charge in the upper end of the cylinder bore 16 and in the combustion chamber 28 and passageway 29 between them.

The ignition system at this point produces a spark across the electrodes of the spark plug 31, firing the compressed charge of gas. The resulting explosion forces the piston 118 downward, the connecting rod transmitting power to the crankshaft which at the same time rotates the exhaust cams to lift the exhaust push rods 94 and rock the exhaust rocker arms 101 on the shaft 105. The rocker arm 103, as a result of its rocking, engages the annular end 88 of the tappet 86 and pushes it inward, raising the poppet valve 38 off its seat 70 in the annular insert 39 and at the same time pushing the intake valve sleeve and consequently the entire intake valve assembly 47 to the right against the contrary urge of the helical springs 82, 59 and 60.

This opens the combustion chamber 28 and passageway 29 to the exhaust passageways 41 and 42 leading to the exhaust manifold 14, so that the exploded gases rush out and pass through the muffler to the atmosphere. The consequent rise of the piston 118 on its scavenging stroke expels any remaining burned gases until it reaches the top of its stroke. At this point, the exhaust cams release the exhaust push rods 94 at the same time the intake cams release the intake push rods 93, causing the entire assembly of the intake and exhaust valves 47 and 38 to move to the left into the position shown in Figure 1. The intake valve 47 is then opened in the manner previously described, and the foregoing cycle is repeated as long as the engine is in operation.

What I claim is:

1. In an internal combustion engine with a cylinder bore and a piston shiftable therein, a cylinder head having an arch-shaped combustion chamber extending upwardly from said cylinder bore, a valve bore disposed transversely of said combustion chamber and communicating therewith, intake and exhaust passageways branching off from said valve bore and combustion chamber, said exhaust passageway having an annular valve seat at its junction with said combustion chamber, an intake sleeve valve reciprocably mounted in said valve bore and movable into and out of said combustion chamber, an igniter in said combustion chamber, an exhaust poppet valve reciprocably mounted in said cylinder head coaxial with said valve bore, said poppet valve on one side engaging said valve seat and on its other side engaging said sleeve valve, said valves having coaxial telescoping valve stems, resilient members engaging and urging said valves into engagement with one another and with said seat, and valve actuators operatively connected to a moving part of said engine in timed relationship therewith and separately engaging said valve stems.

2. In an internal combustion engine with a cylinder bore and a piston shiftable therein, a cylinder head having an arch-shaped combustion chamber extending upwardly from said cylinder bore, a valve bore disposed transversely of said combustion chamber and communicating therewith, intake and exhaust passageways branching off from said valve bore and combustion chamber at opposite ends thereof, said exhaust passageway having an annular valve seat at its junction with said combustion chamber, an intake sleeve valve reciprocably mounted in said valve bore and movable into and out of said combustion chamber, an igniter in said combustion chamber, an exhaust poppet valve reciprocably mounted in said cylinder head coaxial with said valve bore, said poppet valve on one side engaging said valve seat and on its other side engaging said sleeve valve, said valves having coaxial telescoping valve stems, resilient members engaging and urging said valves into engagement with one another and with said seat, and valve actuators operatively connected to a moving part of said engine in timed relationship therewith and separately engaging said valve stems.

3. In an internal combustion engine with a cylinder bore and a piston shiftable therein, a cylinder head having an arch-shaped combustion chamber extending upwardly from said cylinder bore, a valve bore disposed transversely of said combustion chamber and communicating therewith, intake and exhaust passageways branching off from said valve bore and combustion chamber, said exhaust passageway having an annular valve seat at its junction with said combustion chamber, an intake sleeve valve reciprocably mounted in said valve bore and movable into and out of said combustion chamber, an igniter in said combustion chamber, an exhaust poppet valve reciprocably mounted in said cylinder head coaxial with said valve bore, said poppet valve on one side engaging said valve seat and on its other side engaging said sleeve valve, said valves having coaxial telescoping valve stems, said poppet valve having a tubular stem and said sleeve valve having a stem passing through said tubular stem, resilient members engaging and urging said valves into engagement with one another and with said seat, and valve actuators operatively connected to a moving part of said engine in timed relationship therewith and separately engaging said valve stems.

4. In an internal combustion engine, a cylinder head having an upwardly extending gas passageway, a valve bore disposed transversely of said passageway and communicating therewith, intake and exhaust passageways branching off from said valve bore, said exhaust passageway having an annular valve seat at its junction with said valve bore, an intake sleeve valve reciprocably mounted in said valve bore, an exhaust poppet valve reciprocably mounted in said cylinder head coaxial with said valve bore, said poppet valve on one side engaging said valve seat and on its other side engaging said sleeve valve, said valves having coaxial telescoping valve stems, resilient members engaging and urging said valves into engagement with one another and with said seat, and valve actuators operatively connected to a moving part of said engine in timed relationship therewith and separately engaging said valve stems, said sleeve valve having spaced annular grooves remote from one another toward the opposite ends thereof and piston rings in said grooves, said cylinder head having an oil drainage port opening out of said valve bore intermediate the positions of said piston rings in the closed positions of said valves.

5. In an internal combustion engine, a cylinder head having an upwardly extending gas passageway, a valve bore disposed transversely of said passageway and communicating therewith, intake and exhaust passageways branching off from said valve bore, said exhaust passageway having an annular valve seat at its junction with said valve bore, an intake sleeve valve reciprocably mounted in said valve bore, an exhaust poppet valve reciprocably mounted in said cylinder head coaxial with said valve bore, said poppet valve on one side engaging said valve seat and on its other side engaging said sleeve valve, said valves having coaxial telescoping valve stems, resilient members engaging and urging said valves into engagement with one another and with said seat, and valve actuators operatively connected to a moving part of said engine in timed relationship therewith and separately engaging said valve stems, said sleeve valve having spaced annular grooves remote from one another toward the opposite ends thereof and piston rings in said grooves, said cylinder head having an oil supply port opening into said valve bore and an oil drainage port opening out of said valve bore intermediate the positions of said piston rings in the closed positions of said valves.

WM. J. HUBER.

REFERENCES CITED

The following references are of record in the file of this patent:

UNITED STATES PATENTS

| Number | Name | Date |
|---|---|---|
| 987,801 | Greuter | Mar. 28, 1911 |
| 1,186,952 | Shaw | June 13, 1916 |
| 1,728,340 | Gerard | Sept. 17, 1929 |
| 1,957,655 | La Brie | May 8, 1934 |
| 2,213,202 | Buchi | Sept. 3, 1940 |